United States Patent [19]
Brence et al.

[11] Patent Number: 5,538,031
[45] Date of Patent: Jul. 23, 1996

[54] RECREATIONAL VEHICLE WINTERIZING DEVICE

[76] Inventors: Shelby J. Brence; Diana G. Brence, both of 62310 Wagoner Hill, Summerville, Oreg. 97876

[21] Appl. No.: 578,334

[22] Filed: Dec. 26, 1995

[51] Int. Cl.⁶ .............................. E03B 7/12; F16L 53/00
[52] U.S. Cl. .......................... 137/334; 137/565; 137/899; 222/402; 237/80
[58] Field of Search .................. 137/59, 62, 334, 137/337, 565, 899; 222/401, 402; 237/80

[56] References Cited

U.S. PATENT DOCUMENTS

| | | | |
|---|---|---|---|
| 1,295,420 | 2/1919 | Brandt | 222/402 |
| 1,782,657 | 11/1930 | Kegler | 222/402 |
| 2,840,101 | 6/1958 | Saylor | 137/899 |
| 3,091,372 | 5/1963 | Tidd | 222/401 |
| 3,929,154 | 12/1975 | Goodwin | 137/59 |
| 4,286,617 | 9/1981 | Bedient | 137/899 |
| 4,298,021 | 11/1981 | Bozeman | 137/899 |
| 4,531,538 | 7/1985 | Sandt et al. | 137/899 |
| 4,672,990 | 6/1987 | Robillard | 137/337 |
| 5,421,362 | 6/1995 | Sordello | 137/899 |

*Primary Examiner*—George L. Walton

[57] ABSTRACT

A recreational vehicle winterizing device adapted for use in association with a recreational vehicle including a water supply system with a plurality of interconnected rigid pipes, the apparatus comprising: a canister formed in a hollow cylindrical configuration with an upper surface including an aperture, a cylindrical neck with screw threads being positioned around the aperture, antifreeze fluid being positioned within the canister, a tube being positioned through the upper surface and extending within the canister, the tube including a valve to enable the user to regulate the flow of antifreeze therethrough; and a pump assembly including a handle, a cylindrical member and a collar with screw threads, the collar threadedly coupling the cylindrical member through the neck of the canister, the handle having an upper extent including a gripping ring and a lower extent including a rod slidably positioned through the cylindrical member, a user gripping the handle and forcing the rod upward and downward thereby causing pressure to build up within the canister.

4 Claims, 3 Drawing Sheets

FIG 3
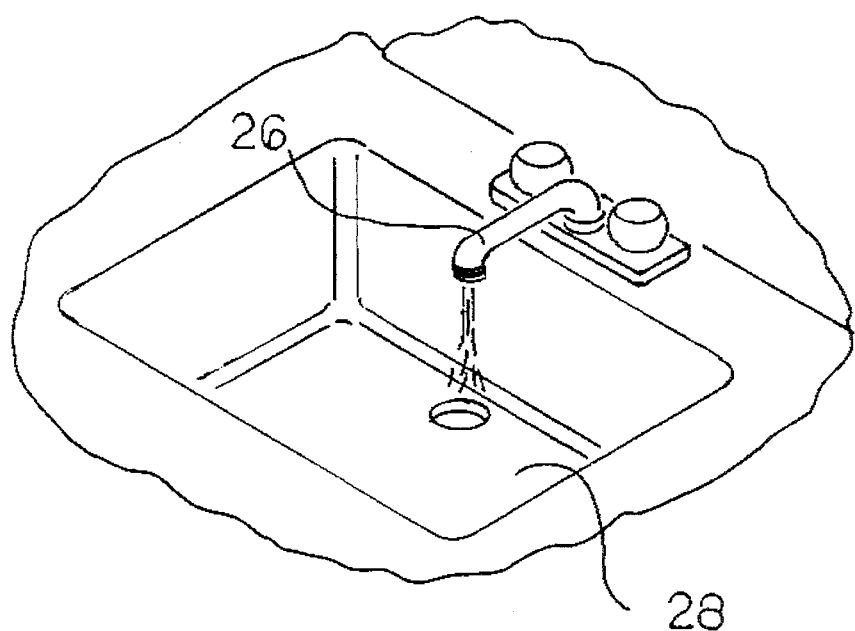
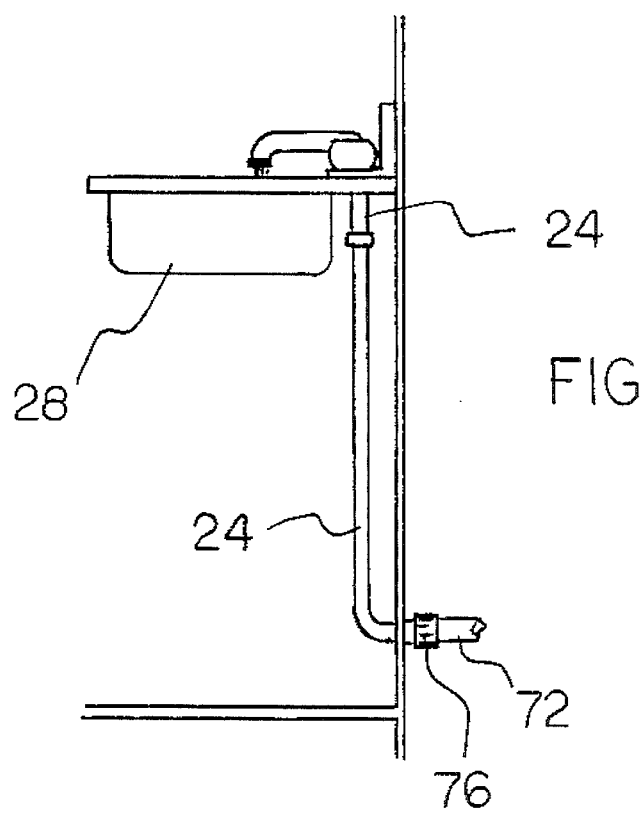
FIG 4

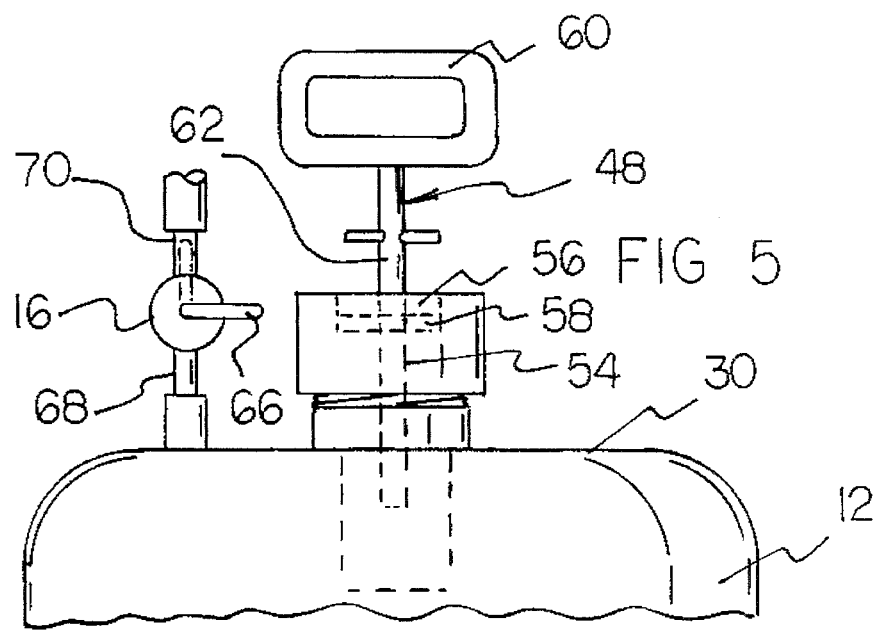
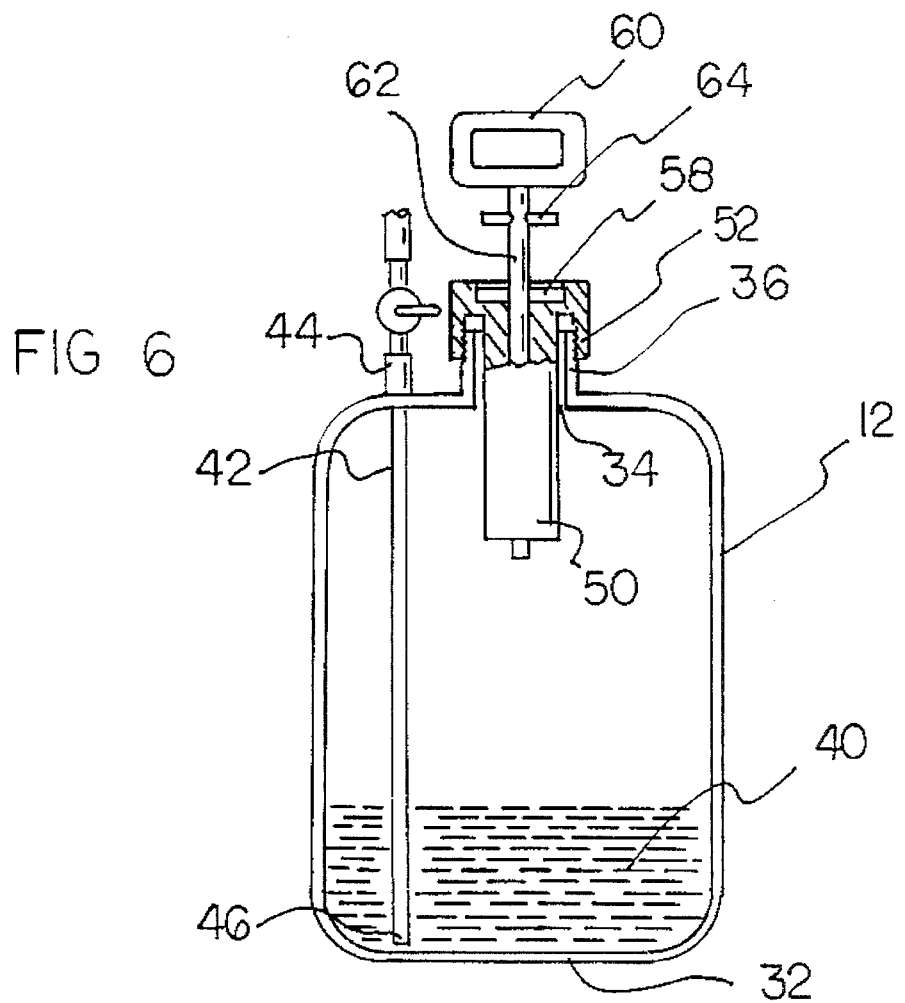

RECREATIONAL VEHICLE WINTERIZING DEVICE

BACKGROUND OF THE INVENTION

1. Field of the Invention

The present invention relates to a recreational vehicle winterizing device and more particularly pertains to pumping antifreeze through the water supply system of a recreational vehicle to prevent the freezing and rupturing of water pipes.

2. Description of the Prior Art

The use of winterizing systems is known in the prior art. More specifically, winterizing systems heretofore devised and utilized for the purpose of preventing damage to various devices when exposed to cold weather conditions are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,035,208 to Culp a method and device for winterizing boat engines.

U.S. Pat. No. 4,531,538 to Sandt discloses a water supply winterizing system.

U.S. Pat. No. 4,298,021 to Bozeman discloses a winterizing apparatus for recreational vehicles, vacation homes and the like.

U.S. Pat. No. 5,142,707 to Prue discloses an additive injection unit for a marine toilet system.

U.S. Pat. No. 4,286,617 to Bedient discloses a water system freeze protection apparatus.

Lastly, U.S. Pat. No. 4,672,990 to Robillard discloses a system for freeze protection of pipes.

In this respect, the recreational vehicle winterizing device according to the present invention substantially departs from the conventional concepts and designs of the prior art, and in doing so provides an apparatus primarily developed for the purpose of pumping antifreeze through the water supply system of a recreational vehicle to prevent the freezing and rupturing of water pipes.

Therefore, it can be appreciated that there exists a continuing need for a new and improved recreational vehicle winterizing device which can be used for pumping antifreeze through the water supply system of a recreational vehicle to prevent the freezing and rupturing of water pipes. In this regard, the present invention substantially fulfills this need.

SUMMARY OF THE INVENTION

In view of the foregoing disadvantages inherent in the known types of winterizing systems now present in the prior art, the present invention provides an improved recreational vehicle winterizing device. As such, the general purpose of the present invention, which will be described subsequently in greater detail, is to provide a new and improved recreational vehicle winterizing device and method which has all the advantages of the prior art and none of the disadvantages.

To attain this, the present invention essentially comprises a new and improved recreational vehicle winterizing device comprising, in combination: a recreational vehicle including a water supply system, the water supply system including a water intake duct, a plurality of interconnected rigid pipes, a water faucet and a sink; a canister fabricated of plastic and formed in a hollow generally cylindrical configuration with a flat upper surface and a flat lower surface, the upper surface having a periphery and a centrally positioned aperture extending therethrough, a cylindrical neck with screw threads being positioned around the centrally positioned aperture, a small hole being positioned through the upper surface adjacent to the periphery, antifreeze fluid being positioned within the canister in an operative orientation, a rigid tube with an upper end and a lower end being vertically positioned through the small hole, the lower end being positioned within the antifreeze fluid, the upper end extending above the upper surface of the canister; a pump assembly including a handle, an elongated cylindrical member and a collar, the cylindrical member having an axis and an upper extent with the collar extending therearound, the collar including screw threads and adapted to be threadedly coupled to the neck with the cylindrical member extending through the neck and within the cylinder, a circular aperture extending through the axis of the cylindrical member, the upper extent of the cylindrical member including a rectangular slot with a cylindrical counterbore positioned therebelow, the handle having an upper extent including a gripping ring and a lower extent including a cylindrical rod, a pin extending perpendicularly across the rod beneath the ring, the rod being slidably positioned within the cylindrical member, a user gripping the handle and forcing the rod upward and downward thereby causing pressure to build up within the canister, the pin adapted to be positioned through the slot and within the counterbore to lock the handle in place upon ninety degree rotation of the gripping ring; and a valve including a switch, an intake port and an output port, the intake port being coupled to the upper extent of the rigid tube, a hose having a first end coupled to the output port of the valve, the hose having a second end including a nozzle adapted to be coupled to the intake duct of the water supply system of the recreational vehicle, the switch being positionable in a vertical orientation whereby antifreeze fluid can pass through the valve and hose, the switch being positionable in a horizontal orientation whereby antifreeze fluid being prevented from passing through the valve and hose, in an operative orientation a user gyrating the rod upward and downward to build pressure within the canister, the switch then being positioned in a vertical orientation permitting the high pressure release of antifreeze fluid through the water supply system of the recreational vehicle to prevent freezing of pipes.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved recreational vehicle winterizing device which has all of the advantages of the prior art winterizing systems and none of the disadvantages.

It is another object of the present invention to provide a new and improved recreational vehicle winterizing device which may be easily and efficiently manufactured and marketed.

It is further object of the present invention to provide a new and improved recreational vehicle winterizing device which is of durable and reliable constructions.

An even further object of the present invention is to provide a new and improved recreational vehicle winterizing device which is susceptible of a low cost of manufacture with regard to both materials and labor, and which accordingly is then susceptible of low prices of sale to the consuming public, thereby making such recreational vehicle winterizing device economically available to the buying public.

Still yet another object of the present invention is to provide a new and improved recreational vehicle winterizing device which provides in the apparatuses and methods of the prior art some of the advantages thereof, while simultaneously overcoming some of the disadvantages normally associated therewith.

Still another object of the present invention is to pumping antifreeze through the water supply system of a recreational vehicle to prevent the freezing and rupturing of water pipes.

Lastly, it is an object of the present invention to provide a new and improved recreational vehicle winterizing device adapted for use in association with a recreational vehicle including a water supply system with a plurality of interconnected rigid pipes, the apparatus comprising: a canister formed in a hollow cylindrical configuration with an upper surface including an aperture, a cylindrical neck with screw threads being positioned around the aperture, antifreeze fluid being positioned within the canister, a tube being positioned through the upper surface and extending within the canister, the tube including a valve to enable the user to regulate the flow of antifreeze therethrough; and a pump assembly including a handle, a cylindrical member and a collar with screw threads, the collar threadedly coupling the cylindrical member through the neck of the canister, the handle having an upper extent including a gripping ring and a lower extent including a rod slidably positioned through the cylindrical member, a user gripping the handle and forcing the rod upward and downward thereby causing pressure to build up within the canister.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top perspective view of the water faucet and sink of the recreational vehicle.

FIG. 4 is a side perspective view of the water faucet and sink of the recreational vehicle.

FIG. 5 is a partially broken away perspective view of the pump assembly of the apparatus.

FIG. 6 is a cross sectional view taken along section line 6—6 of FIG. 2.

The same reference numerals refer to the same parts through the various FIGS.

DESCRIPTION OF THE PREFERRED EMBODIMENT

Figure 1:
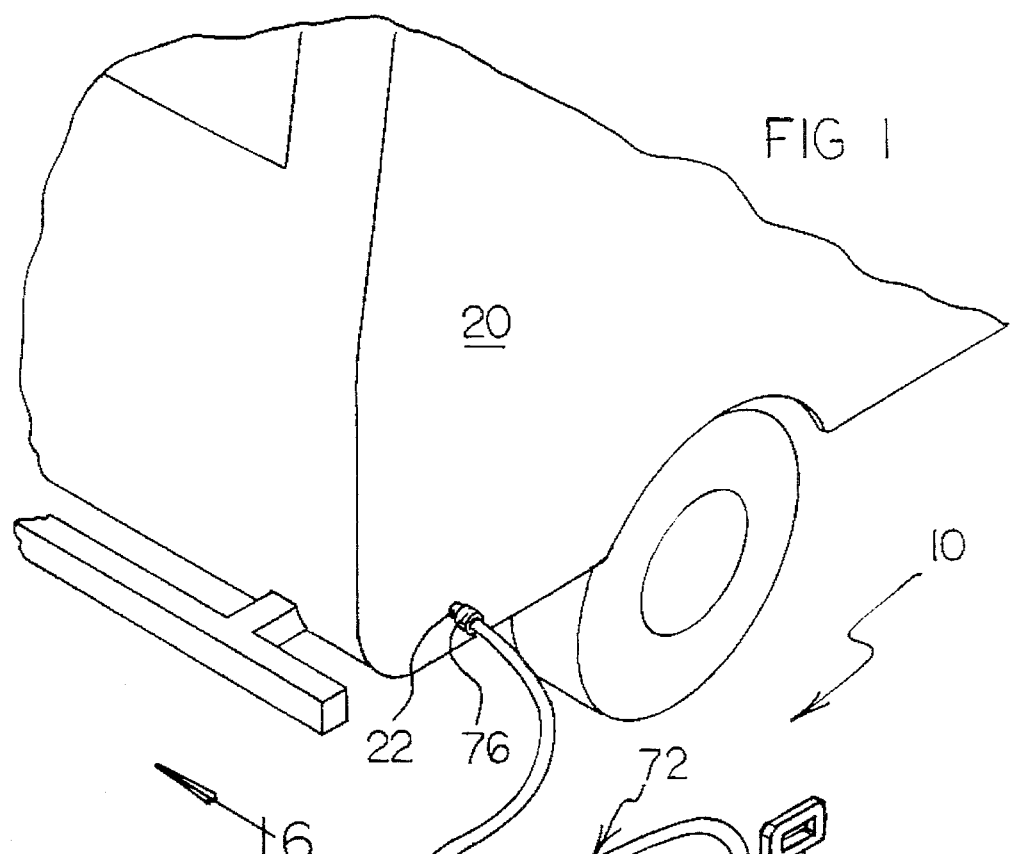
FIG. 1 is a perspective view of the preferred embodiment of the recreational vehicle winterizing device constructed in accordance with the principles of the present invention.

With reference now to the drawings, and in particular to FIG. 1 thereof, the preferred embodiment of the new and improved recreational vehicle winterizing device embodying the principles and concepts of the present invention and generally designated by the reference numeral 10 will be described.

The present invention, the recreational vehicle winterizing device 10 is comprised of a plurality of components. Such components in their broadest context include a canister 12, a pump assembly 14 and a valve 16. Such components are individually configured and correlated with respect to each other so as to attain the desired objective.

More specifically, a recreational vehicle 20 is included with the apparatus. In varying embodiments the recreational vehicle is a camper, motor home, trailer, boat or other type of recreational vehicle. In all embodiments the recreational vehicle includes a water supply system. Some embodiments of the apparatus do not include a recreational vehicle but are adapted for use in association with such a vehicle. The water supply system has a water intake duct 22, a plurality of interconnected rigid pipes 24, a water faucet 26 and a sink 28. Note FIG. 1, 3 and 4.

In an operative orientation the water intake duct of the recreational vehicle is coupled to a water source such as a hose and spigot. During use water flows through the pipes and remains within them in when the vehicle is left dormant. This is particularly true for low lying pipes and drains. When the temperature falls below thirty two degrees Fahrenheit or zero degrees Celsius the pipes freeze and burst. The present invention is designed to prevent freezing of residual water by injecting antifreeze fluid within the pipes. Note FIG. 1.

A canister 12 is fabricated of plastic and formed in a hollow generally cylindrical configuration with a flat upper surface 30 and a flat lower surface 32. In the preferred embodiment the canister has a perimeter of twenty eight inches, a diameter of nine inches and a height from the bottom of the canister to the top of the handle of nineteen inches. The upper surface has a periphery and a centrally positioned aperture 34 extending through it. A cylindrical neck 36 with screw threads is positioned around the centrally positioned aperture. A small hole is positioned through the upper surface adjacent to the periphery. In an operative orientation two to three gallons of antifreeze fluid 40 is inserted into the canister through the neck. A rigid tube 42 with an upper end 44 and a lower end 46 is vertically positioned through the small hole. The lower end is positioned within the antifreeze fluid. The upper end extends above the upper surface of the canister. Note FIGS. 5 and 6.

A pump assembly 14 includes a handle 48, an elongated cylindrical member 50 and a collar 52. The cylindrical member has an axis and an upper extent. The collar extends around the upper extent and includes screw threads. The collar is adapted to be threadedly coupled to the neck of the cylinder with the cylindrical member extending through the neck and within the cylinder. A circular aperture 54 extends through the axis of the cylindrical member. The upper extent of the cylindrical member includes a rectangular slot 56 with a cylindrical counterbore 58 positioned below it. Note FIGS. 5 and 6.

Figure 2:
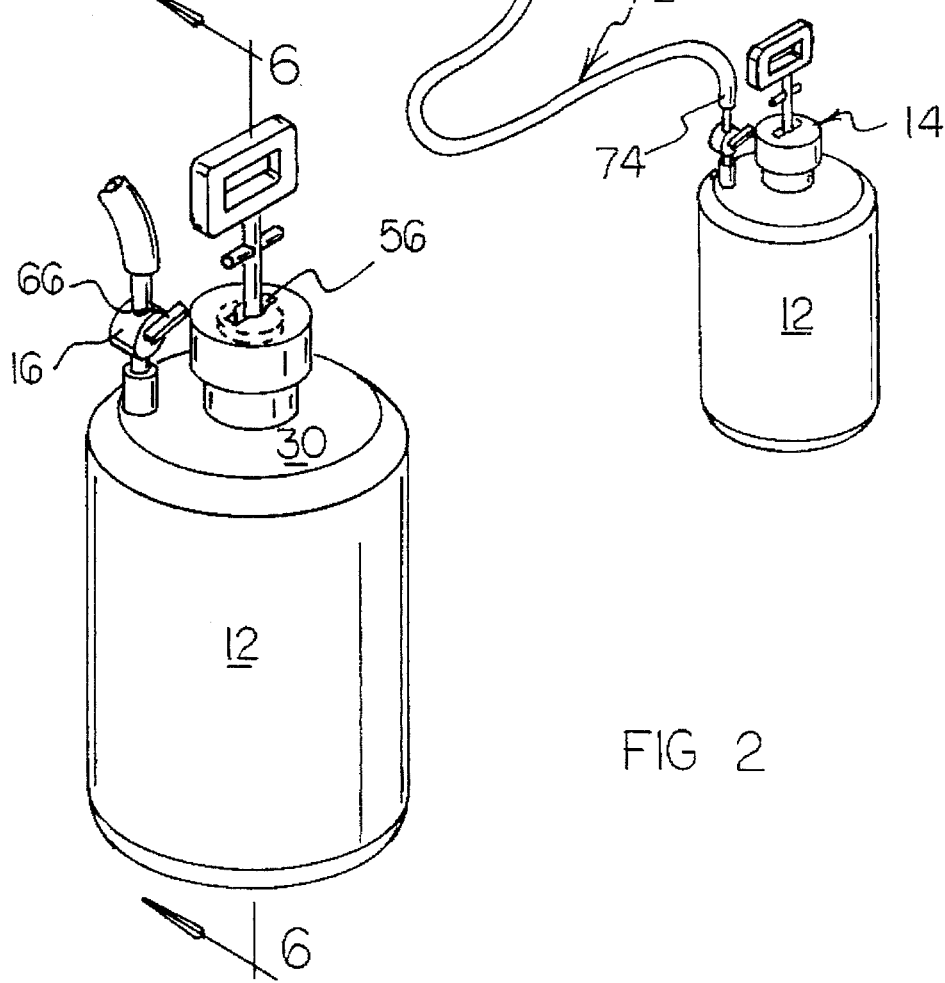
FIG. 2 is an isolated perspective view of the canister and pump assembly of the apparatus.

The handle 48 has an upper extent which includes a gripping ring 60 and a lower extent which includes a cylindrical rod 62. The gripping ring is formed in a rectangular configuration to permit comfortable positioning of a user's hand through it. A pin 64 extends perpendicularly across the rod beneath the ring. The rod is slidably positioned within the cylindrical member. In an operative orientation a user grips the handle and forces the rod upward and downward thereby causing pressure to build up within the canister. The pin is adapted to be positioned through the slot and within the counterbore to lock the handle in place upon ninety degree rotation of the gripping ring. Note FIGS. 2, 5 and 6.

A valve 16 includes a switch 66, an intake port 68 and an output port 70. The intake port is coupled to the upper extent of the rigid tube. A hose 72 has a first end 74 coupled to the output port of the valve. The hose has a second end which includes a nozzle 76 adapted to be coupled to the intake duct of the water supply system of the recreational vehicle. The hose is fabricated of sturdy elastomeric materials and is flexible enough to permit winding around the canister when the apparatus is being stored. The hose has a length of between twenty and forty inches in the preferred embodiment. Note FIGS. 1 and 4.

The switch 66 is positionable in an operative vertical orientation whereby antifreeze fluid is permitted to pass through the valve and hose. The switch is positionable in an inoperative horizontal orientation whereby antifreeze fluid is prevented from passing through the valve and hose. In an operative orientation a user first gyrates the rod upward and downward to build pressure within the canister. Next, the nozzle of the hose is coupled to the water intake duct of the recreational vehicle. The switch is then moved to a vertical orientation to permit the high pressure release of antifreeze fluid through the pipes of the water supply system of the recreational vehicle. The water faucets of the recreational vehicle are then positioned in an "on" orientation. This procedure fills the pipes with antifreeze thereby preventing freezing of fluid within the pipes when the outdoor temperature falls below thirty two degrees Fahrenheit or zero degrees Celsius. Note FIGS. 1, 3 and 4.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved recreational vehicle winterizing device comprising, in combination:

a recreational vehicle including a water supply system, the water supply system including a water intake duct, a plurality of interconnected rigid pipes, a water faucet and a sink;

a canister fabricated of plastic and formed in a hollow generally cylindrical configuration with a flat upper surface and a flat lower surface, the upper surface having a periphery and a centrally positioned aperture extending therethrough, a cylindrical neck with screw threads being positioned around the centrally positioned aperture, a small hole being positioned through the upper surface adjacent to the periphery, antifreeze fluid being positioned within the canister in an operative orientation, a rigid tube with an upper end and a lower end being vertically positioned through the small hole, the lower end being positioned within the antifreeze fluid, the upper end extending above the upper surface of the canister;

a pump assembly including a handle, an elongated cylindrical member and a collar, the cylindrical member having an axis and an upper extent with the collar extending therearound, the collar including screw threads and adapted to be threadedly coupled to the neck with the cylindrical member extending through the neck and within the cylinder, a circular aperture extending through the axis of the cylindrical member, the upper extent of the cylindrical member including a rectangular slot with a cylindrical counterbore positioned therebelow, the handle having an upper extent including a gripping ring and a lower extent including a cylindrical rod, a pin extending perpendicularly across the rod beneath the ring, the rod being slidably positioned within the cylindrical member, a user gripping the handle and forcing the rod upward and downward thereby causing pressure to build up within the canister, the pin adapted to be positioned through the slot and within the counterbore to lock the handle in place upon ninety degree rotation of the gripping ring; and a valve including a switch, an intake port and an output port, the intake port being coupled to the upper extent of the rigid tube, a hose having a first end coupled to the output port of the valve, the hose having a second end including a nozzle adapted to be coupled to the intake duct of the water supply system of the recreational vehicle, the switch being positionable in a vertical orientation whereby antifreeze fluid can pass through the valve and hose, the switch being positionable in a horizontal orientation whereby antifreeze fluid being prevented from passing through the valve and hose, in an operative orientation a user gyrating the rod upward and downward to build pressure within the canister, the switch then being positioned in a vertical orientation permitting the high pressure release of antifreeze fluid through the water supply system of the recreational vehicle to prevent freezing of pipes.

2. A recreational vehicle winterizing device adapted for use in association with a recreational vehicle including a water supply system with a plurality of interconnected rigid pipes, the apparatus comprising:

a canister formed in a hollow cylindrical configuration with an upper surface including an aperture, a cylindrical neck with screw threads being positioned around the aperture, antifreeze fluid being positioned within the canister in an operative orientation, a tube being positioned through the upper surface and extending within the canister, the tube including a valve to enable the user to regulate the flow of antifreeze therethrough; and a pump assembly including a handle, a cylindrical member and a collar with screw threads, the collar threadedly coupling the cylindrical member through the neck of the canister, the handle having an upper extent including a gripping ring and a lower extent including a rod slidably positioned through the cylindrical member, a user gripping the handle and forcing the rod upward and downward thereby causing pressure to build up within the canister.

3. The recreational vehicle winterizing device as set forth in claim 2 wherein the valve includes a switch, an intake port and an output port, the intake port being coupled to an upper extent of the tube, the apparatus further including:

a hose having a first end coupled to the output port of the valve, the hose having a second end including a nozzle adapted to be coupled to the water supply system of a recreational vehicle, the switch being positionable in a vertical orientation whereby antifreeze fluid can pass through the valve and hose, the switch being positionable in a horizontal orientation whereby antifreeze fluid being prevented from passing through the valve and hose, in an operative orientation a user gyrating the rod upward and downward to build pressure within the canister, the switch then being positioned in a vertical orientation permitting the high pressure release of antifreeze fluid through the water supply system of the recreational vehicle to prevent freezing of pipes.

4. The apparatus as set forth in claim 2 wherein the cylindrical member has an upper surface which includes a rectangular slot with a cylindrical counterbore positioned therebelow, the apparatus further including:

a pin extending perpendicularly across the rod beneath the ring, the pin adapted to be positioned through the slot and within the counterbore to lock the handle in place upon ninety degree rotation of the gripping ring.

\* \* \* \* \*